United States Patent
Shin et al.

(10) Patent No.: US 9,581,284 B2
(45) Date of Patent: Feb. 28, 2017

(54) DISPLAY APPARATUS

(71) Applicant: LG ELECTRONICS INC., Seoul (KR)

(72) Inventors: Donghyok Shin, Seoul (KR); SungJin Eun, Seoul (KR); Sangdon Park, Seoul (KR); Inkeun Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/798,800

(22) Filed: Jul. 14, 2015

(65) Prior Publication Data

US 2016/0021769 A1  Jan. 21, 2016

(30) Foreign Application Priority Data

Jul. 15, 2014 (KR) .................. 10-2014-0089287

(51) Int. Cl.
| | | |
|---|---|---|
| *G06F 1/16* | (2006.01) | |
| *F16M 11/00* | (2006.01) | |
| *F16M 11/16* | (2006.01) | |
| *F16M 11/22* | (2006.01) | |
| *F16M 13/02* | (2006.01) | |

(52) U.S. Cl.
CPC ............. *F16M 11/00* (2013.01); *F16M 11/16* (2013.01); *F16M 11/22* (2013.01); *F16M 13/02* (2013.01); *F16M 2200/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,251,125 B2 * | 7/2007 | Heckerman | ............ | A47B 97/04 361/679.27 |
| 7,261,267 B2 * | 8/2007 | Frydkjær | ............... | F16M 11/10 248/292.12 |
| 7,466,540 B2 * | 12/2008 | Takahashi | ................ | H04N 5/64 345/582 |
| 7,489,500 B2 * | 2/2009 | Liou | ...................... | F16M 11/00 248/688 |
| 7,864,515 B2 * | 1/2011 | Numata | ................. | F16M 13/00 248/122.1 |
| 7,986,515 B2 * | 7/2011 | Numata | ................. | F16M 13/00 248/122.1 |
| 8,054,617 B2 * | 11/2011 | Kuang | ................... | F16M 11/10 361/679.22 |
| 8,120,897 B2 * | 2/2012 | Vanduyn | ................ | F16M 11/00 248/917 |
| 8,174,823 B2 * | 5/2012 | Green | .................... | F16M 11/08 361/679.25 |

(Continued)

*Primary Examiner* — Lisa Lea Edmonds
(74) *Attorney, Agent, or Firm* — KED & Associates, LLP

(57) ABSTRACT

The display apparatus is provided. The display apparatus includes a display panel for outputting an image, a panel cover for covering a rear surface of the display panel, a first part fixed to the rear surface of the display unit, a second part rotatably coupled to the first part, the second part being closely attached to the first part or being disposed on an installation surface, a hinge connecting a lower end of the first part to a front end of the second part, a wall-mounting plate separably coupled to a bottom surface of the second part, and a fall-down prevention member separably coupled to a lower end of the display unit.

18 Claims, 13 Drawing Sheets

(56) References Cited

U.S. PATENT DOCUMENTS

| | | | | |
|---|---|---|---|---|
| 8,390,996 B2* | 3/2013 | Park | ............... | F16M 11/24 |
| | | | | 248/917 |
| 8,605,429 B2* | 12/2013 | Shen | ............... | F16M 11/105 |
| | | | | 248/371 |
| 8,864,092 B2* | 10/2014 | Newville | ............... | F16M 11/08 |
| | | | | 248/123.11 |
| 9,265,346 B1* | 2/2016 | Forney | ............... | A47B 97/001 |
| 9,329,636 B2* | 5/2016 | Ning | ............... | G06F 1/166 |
| 9,388,933 B2* | 7/2016 | Zhang | ............... | F16M 11/10 |
| 2011/0180674 A1* | 7/2011 | Bliven | ............... | F16M 11/00 |
| | | | | 248/121 |
| 2013/0107430 A1* | 5/2013 | Wu | ............... | H04N 5/64 |
| | | | | 361/679.01 |
| 2014/0140023 A1* | 5/2014 | Lee | ............... | H05K 5/03 |
| | | | | 361/755 |

* cited by examiner

DISPLAY APPARATUS

CROSS-REFERENCE TO RELATED APPLICATION

The present application claims the benefits of priority to Korean Patent Application No. 10-2014-0089287 filed on Jul. 15, 2014, which is herein incorporated by reference in its entirety.

BACKGROUND

The present disclosure relates to a display apparatus.

Display apparatuses include display panels for outputting pictures or images.

In recent years, as the trend is larger and compact display panels, a special mounting device for installing display apparatus on a wall is needed.

Typically, standing type stands and wall-mounting type stands are separately provided, and thus one of the stands has to be selected when purchasing a display apparatus. Accordingly, if it is intended to change in mounting type after the purchase, the changing stand has to be separately purchased.

SUMMARY

Embodiments provide a display apparatus capable of being installed on a floor as well as a wall by using a mounting device provided when purchased in order to overcome the shortcomings of the above-mentioned display apparatus.

In one embodiment, a display apparatus includes: a display panel for outputting an image; a panel cover for covering a rear surface of the display panel; a first part fixed to the rear surface of the display unit; a second part rotatably coupled to the first part, the second part being closely attached to the first part or being disposed on an installation surface; a hinge connecting a lower end of the first part to a front end of the second part; a wall-mounting plate separably coupled to a bottom surface of the second part; and a fall-down prevention member separably coupled to a lower end of the display unit.

According to a display apparatus of an embodiment, a mounting part for installing a display device on a flat surface is also used for installing it on a wall, and thus additional mounting part for changing mounting types is not necessary.

DETAILED DESCRIPTION OF THE EMBODIMENTS

A display apparatus according to an embodiment will be described in detail with reference to the accompanying drawings.

Figure 1:
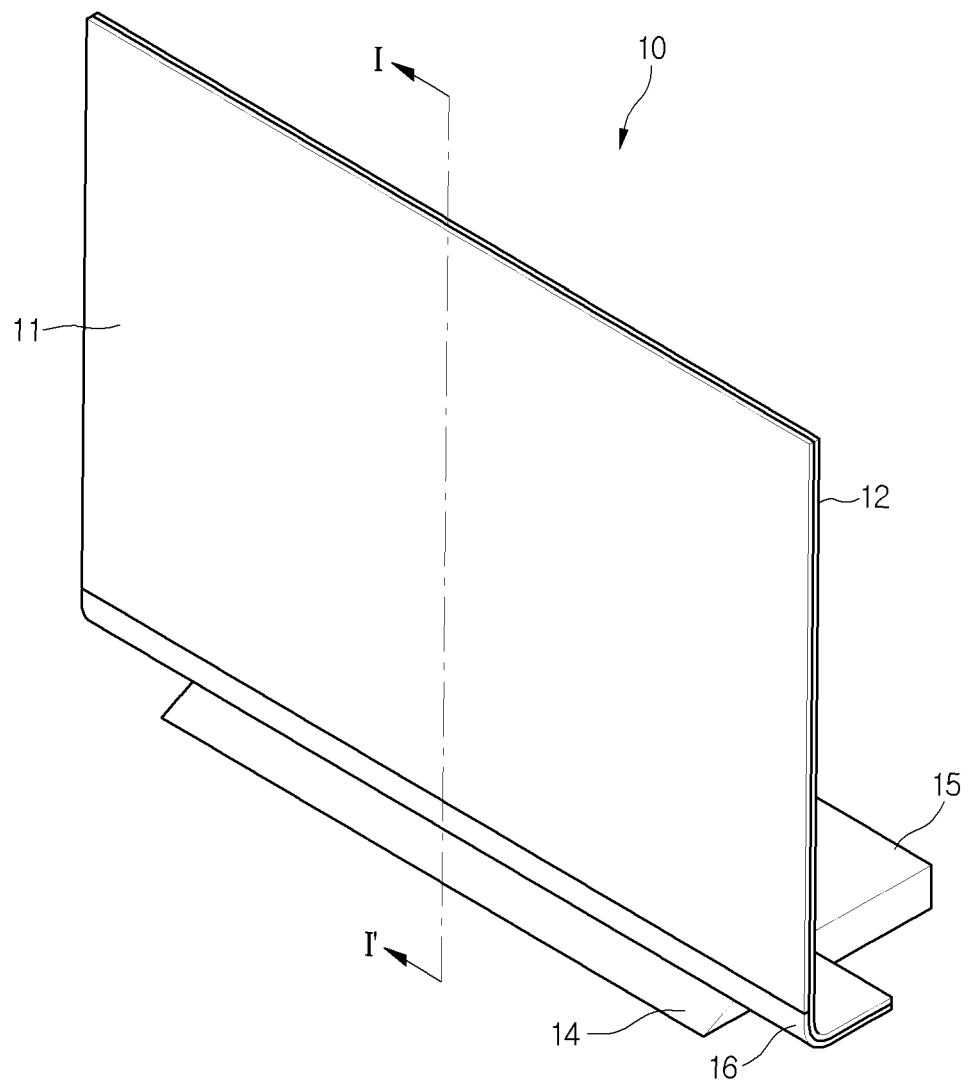
FIG. 1 is a front perspective view of a display apparatus according to an embodiment.
Figure 2:
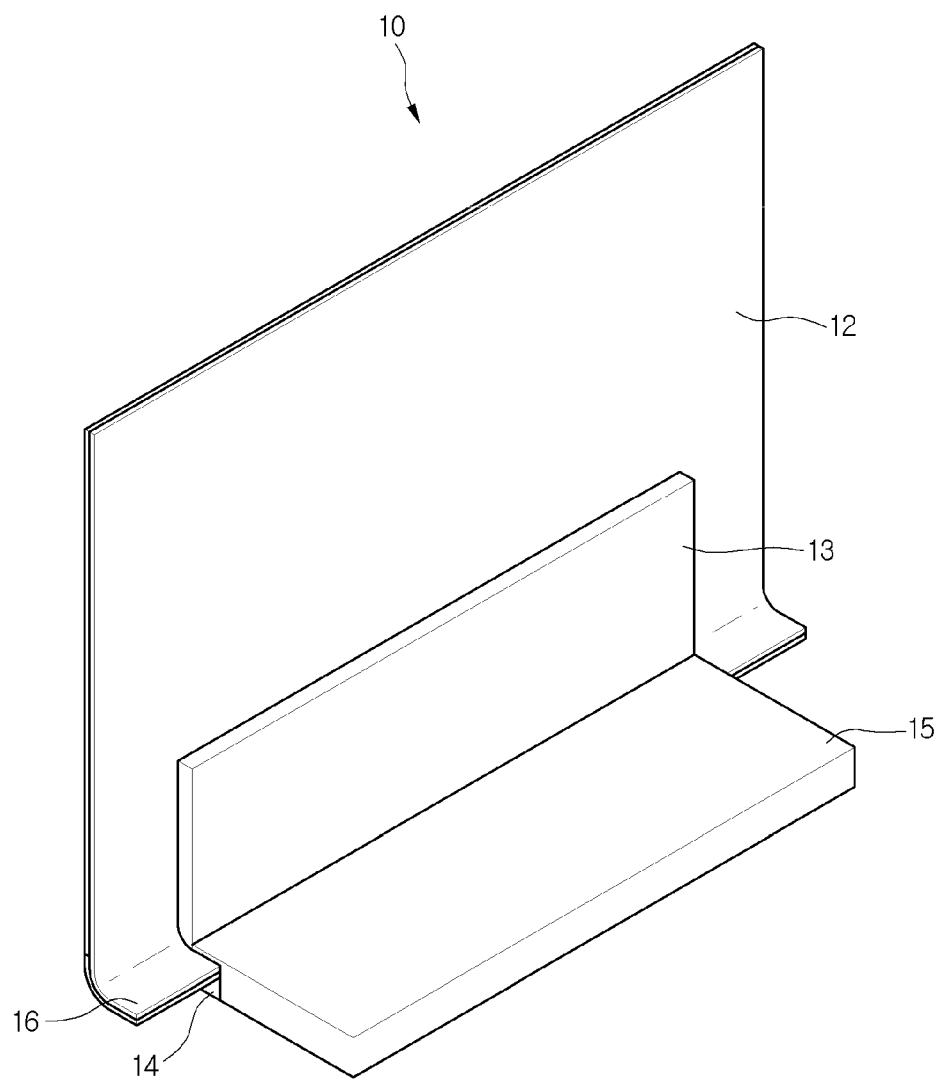
FIG. 2 is a rear perspective view of the display apparatus.
Figure 3:
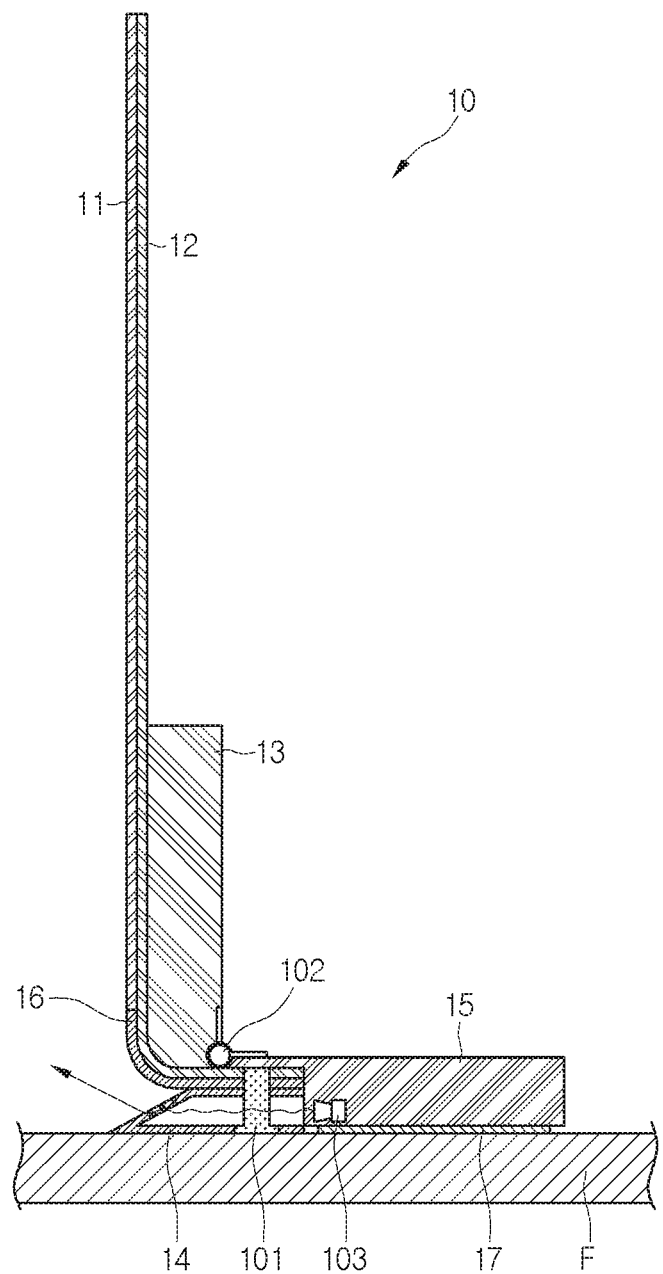
FIG. 3 is a side cross-sectional view of the display apparatus, taken along line I-I of FIG. 1.

FIG. 1 is a front perspective view of a display apparatus according to an embodiment, FIG. 2 is a rear perspective view of the display apparatus, and FIG. 3 is a side cross-sectional view of the display apparatus, taken along line I-I of FIG. 1.

Referring to FIGS. 1 to 3, a display apparatus 10 according to an embodiment may include a display panel 11 on which an image is displayed and a panel cover 12 attached to a back surface of the display panel 11 to support the display panel 11.

In detail, an assembly of the display panel 11 and the panel cover 12 may be defined as a display unit. The display panel 11 includes an LCD panel or an OLED panel.

The display apparatus 10 may further include a lower decor 16 coupled to a lower end of the display unit, a fall-down prevention member 14 coupled to a bottom surface of the lower decor 16, a rear cover 13 mounted on a rear lower portion of the panel cover 12, an audio box 15 rotatably coupled on a lower portion of the rear cover 13, and a wall-mounting plate 17 coupled to a bottom surface of the audio box 15.

In detail, electronic components for driving the display panel 11 may be installed in the rear cover 13, and a speaker 103 for generating sounds and electronic components for driving the speaker may be installed in the audio box 15. The audio box 15 may be rotatably installed on a lower end of the rear cover 13 by using a hinge 102. Thus, when the display unit is installed on the floor F, the audio box 15 may function as a stand or base supporting the display unit. When the display unit is installed on a wall, the audio box 15 may function as a fixing member fixing the display unit on the wall in a state where the display unit is in a vertical state.

Here, a portion that is rotatably coupled to the rear cover 13 may not be necessarily the audio box, but a component box including other built-in electronic components. Thus, the rear cover 13 and the audio box 15 may be defined as a first part and a second part, respectively.

The fall-down prevention member 14 may be fixed to a bottom surface of the lower decor 16 by a coupling member 101. In detail, the fall-down prevention member 14 is mounted on the bottom surface of the lower decor 16 to prevent the display apparatus 10 from falling down forward. Also, the fall-down prevention member 14 may be empty, and sounds generated from the speaker 103 may be outputted through a front surface of the fall-down prevention member 14.

Figure 4:
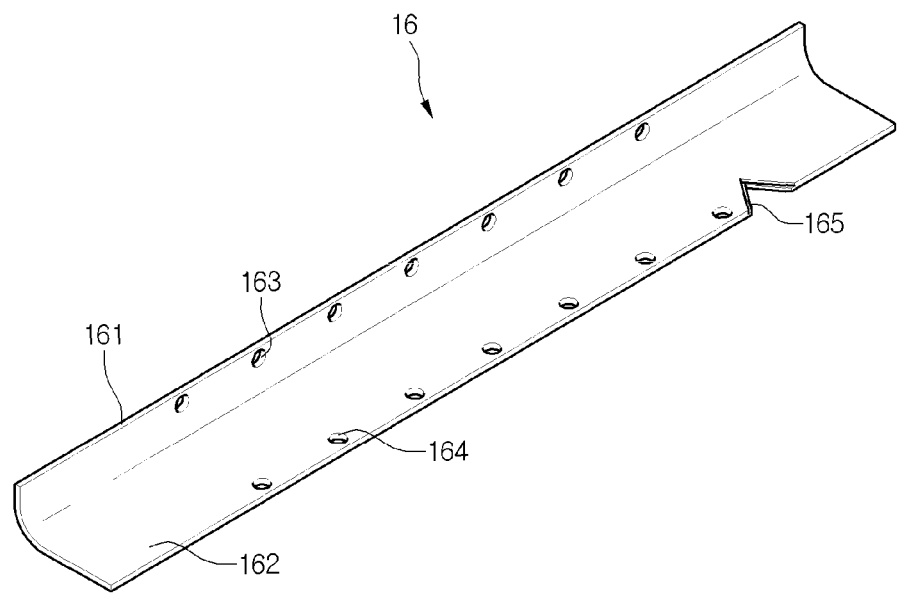
FIG. 4 is a perspective view of a lower decor constituting the display apparatus according to an embodiment.

FIG. 4 is a perspective view of a lower decor constituting a display apparatus according to an embodiment.

Referring to FIG. 4, the lower decor 16 constituting the display apparatus 10 according to an embodiment includes a front part 161 defining a front surface of the lower end of the display unit and a bottom part 162 bent backward from a lower end of the front part 161 face a bottom surface.

In detail, the panel cover 12 completely covers the back surface of the display panel 11 to protect the back surface of the display panel 11. Also, a lower end of the panel cover 12 may be bent backward. However, the lower end of the panel cover 12 may not be necessarily bent backward as illustrated in the drawings. In other word, the panel cover 12 and the display panel 11 may have the same size, and the lower end and the bottom surface of the display unit may be defined by the lower decor 16.

In more detail, a plurality of first coupling holes 163 may be defined in the front surface 161 of the lower decor 16, and a plurality of second coupling holes 164 may be defined in the bottom part 162. Also, a wire guiding groove 165 may be recessed in an edge of a side of the bottom part 162. Each of the first coupling holes 163 may be a hole into which a coupling member connecting the lower decor 16 to the panel cover 12 is inserted, and each of the second coupling holes 164 may be a hole into which a coupling member 101 connecting the lower decor 16 to the fall-down prevention member 14 is inserted. The wire guiding groove 165 may be a groove for accommodating wires connected to the audio box 15.

The lower decor 16 may be formed of a metal material having sufficient rigidity that is capable of enduring a weight of the display unit without being bent.

Figure 5:
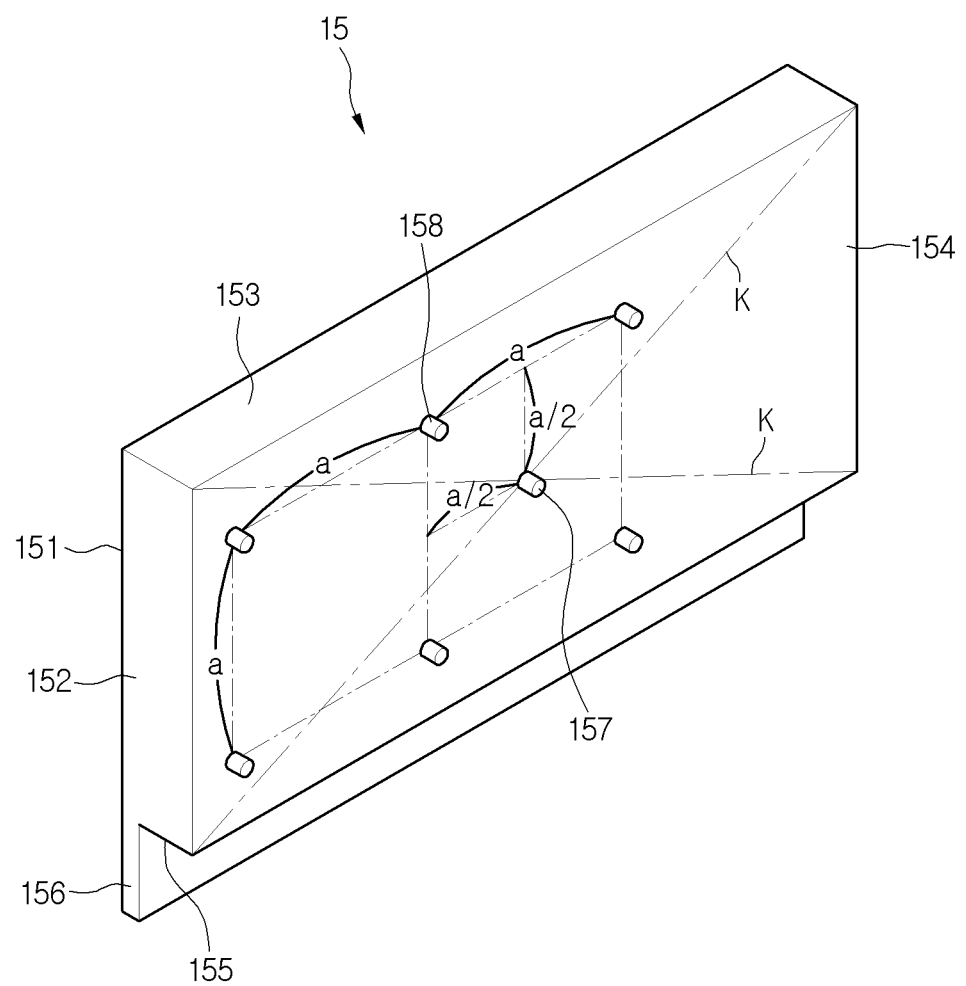
FIG. 5 is a perspective view of an audio box constituting the display apparatus according to an embodiment.

FIG. 5 is a perspective view of an audio box constituting a display apparatus according to an embodiment.

Referring to FIG. 5, the audio box 15 (or the second part) may have a hexahedral box shape having a top surface 151, a side surface 152, a rear surface 153, a bottom surface 154, and a front surface 155. Also, an extension end 156 may further extend from the front surface 155. The hinge 102 may have one end coupled to the extension end 156 and the other end coupled to the rear cover 13.

The front surface 155 is disposed on a rear side of the extension end 156 to prevent the bottom surface 154 of the audio box 15 from interfering with the bottom part 162 of the lower decor 16 when the bottom surface 154 of the audio box 15 is disposed on the horizontal floor. A rear surface of the fall-down prevention member 14 is closely attached to the front surface 155.

The top surface 151 faces upward when the display apparatus 10 is disposed on the horizontal installation surface. Also, the top surface 151 is closely attached to the rear cover 13 when the display apparatus is installed on the wall. The wall-mounting plate 17 is coupled to the bottom surface 154. A plurality of pem nuts 158 or coupling bosses may be provided in the bottom surface 154.

In detail, the wall-mounting plate 17 is coupled to the bottom surface 154 by inserting a coupling member passing through the wall-mounting plate 17 into each of the plurality of pem nuts 158. The pem nuts 158 adjacent to each other may be disposed at the same distance. In other words, the pem nuts 158 that are horizontally and vertically adjacent to each other are disposed to be spaced the same distance a from each other. Here, when four pem nuts 158 are connected to each other through a virtual line, a square shape may be formed.

Also, a stopper 157 may protrude between the plurality of pem nuts 158. The stopper 157 may protrude by a length corresponding to a thickness of the wall-mounting plate 17. In detail, the stopper 157 may be disposed at a center of the square shape that is defined by connecting the four neighboring pem nuts 158 to each other. That is, a distance from the horizontal or vertical line, which are defined by connecting the adjacent pem nuts 158 to each other, to the stopper 157 corresponds to a half (a/2) of a horizontal or vertical distance a between the adjacent pem nuts 158.

A position on which the stopper 157 is disposed may correspond to an exact center of the bottom surface 154. That is, the stopper 157 is disposed on a position at which diagonal lines k connecting corners of the bottom surface 154 are intersected. This is done for preventing the display apparatus 10 from being leaned in left and right directions by the load imbalance when the wall-mounting plate 17 is vertically fixed to the audio box 15 and installed on the wall. This will be described below in more detail with reference to the accompanying drawings.

Figure 6:
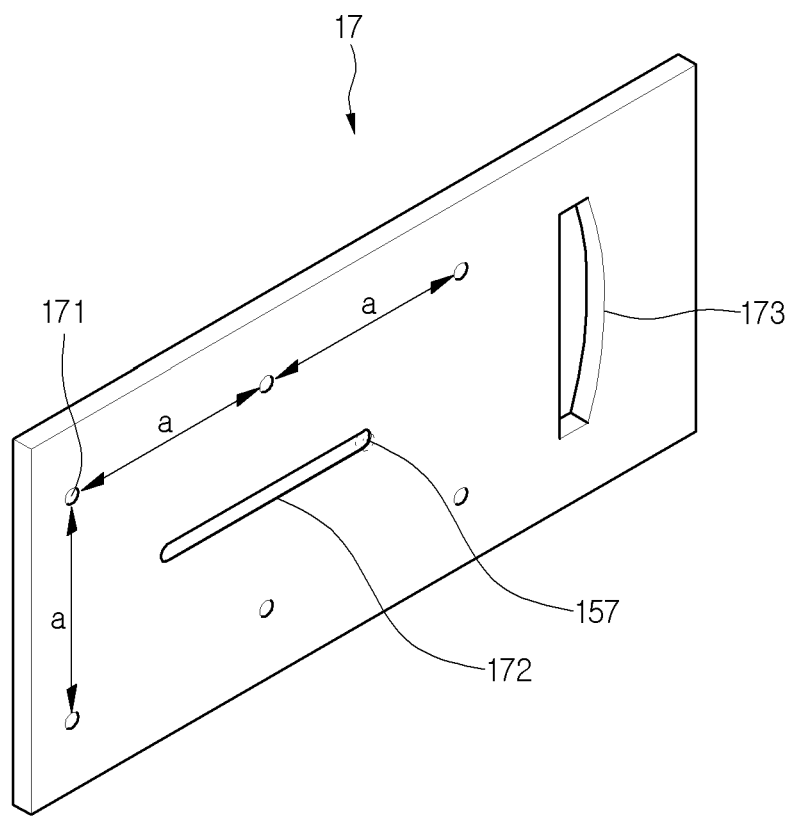
FIG. 6 is a front perspective view of a wall-mounting plate constituting the display apparatus according to an embodiment.

FIG. 6 is a front perspective view of a wall-mounting plate constituting the display apparatus according to an embodiment.

Referring to FIG. 6, the wall-mounting plate 17 constituting the display apparatus 10 according to an embodiment may be mounted on the bottom surface of the audio box 15.

In detail, since the wall-mounting plate 17 is used when the display apparatus 10 is installed on the wall, when the display apparatus 10 is installed on the horizontal floor, a state where the wall-mounting plate is coupled to the bottom surface of the audio box 15 is maintained. Also, since the wall-mounting plate 17 has to have sufficient rigidity that is capable of the total weight of the display apparatus 10, the wall-mounting plate 17 may be formed of a plastic or metal plate having sufficient rigidity.

Also, a wall-mounting hole 173 is defined in an edge of a side of the wall-mounting plate 17, and a guide slit 172 extending by a predetermined length in a longitudinal direction of the wall-mounting plate 17 is defined in a central portion of the wall-mounting plate 17. The stopper 157 protruding from a center of the bottom surface of the audio box 15 is inserted into the guide slit 172. The guide slit 172 has one end disposed adjacent to a side edge of the wall-mounting plate 17 and the other end disposed on an exact center of the wall-mounting plate 17.

In detail, when the wall-mounting plate 17 moves and rotates to mount the display apparatus 10 on the wall, the stopper 157 relatively moves along the guide slit 172.

Also, a plurality of coupling holes 171 corresponding to the plurality of pem nuts 158 protruding from the bottom surface of the audio box 15 are defined in the wall-mounting plate 17. Of course, the plurality of coupling holes 171 are disposed at the same distance a in horizontal and vertical directions. Two squares are formed by virtual lines connecting the plurality of coupling holes 171 to each other in a width (short side) direction and a length (long side) direction of the wall-mounting plate 17. In addition, the guide slit 172 has both ends disposed at an exact center of the two squares, respectively.

Figure 7:
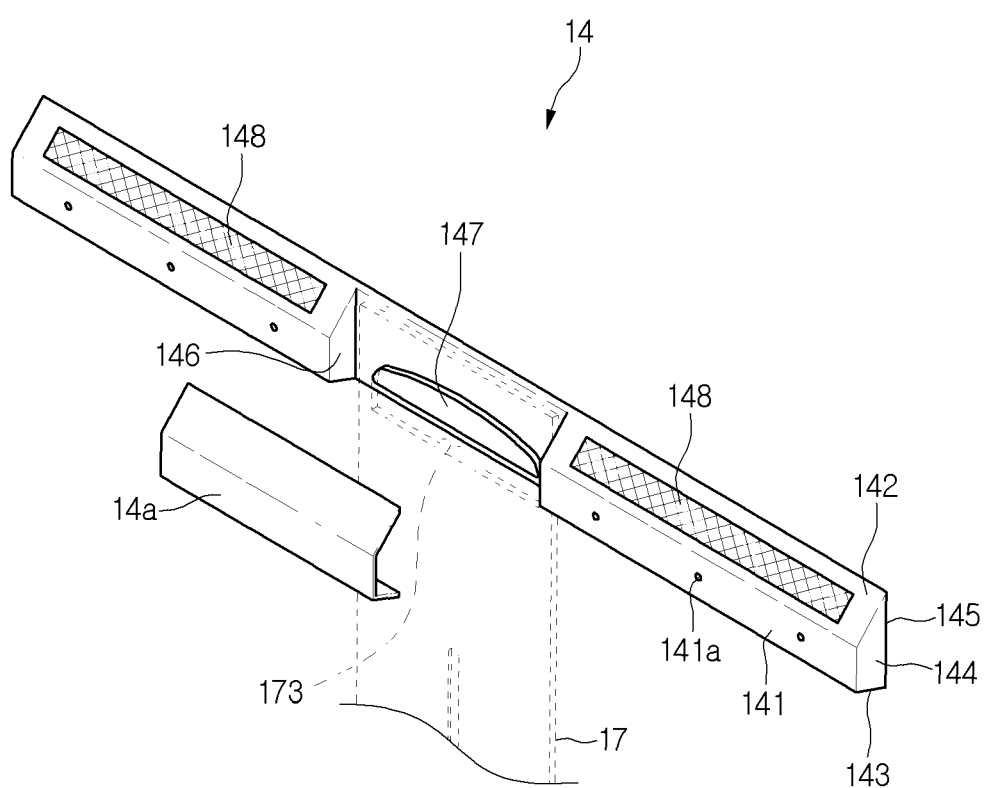
FIG. 7 is a perspective view of a fall-down prevention member constituting the display apparatus according to an embodiment.

FIG. 7 is a perspective view of the fall-down prevention member constituting the display apparatus according to an embodiment.

Referring to FIG. 7, the fall-down prevention member 14 constituting the display apparatus 10 according to an embodiment is mounted on the bottom surface of the lower decor 16 to prevent the display apparatus 10 from falling down forward as described above. The fall-down prevention member may guide sounds outputted from the audio box 15 so that the sounds are outputted to a front side of the display apparatus 10 through the lower decor 16.

When the display apparatus 10 is installed on the wall, the fall-down prevention member 14 is separated from the lower decor 16 and fixed to the wall. Also, the fall-down prevention member supports a weight of the display apparatus 10 by mounting the wall-mounting plate 17 on the fall-down prevention member 14.

In detail, a seating groove 146 which is recessed by a predetermined depth and has a width corresponding to that of the wall-mounting plate 17 is defined in a center of the fall-down prevention member 14, and a hook projection 147 protrudes from a bottom of the seating groove 146. The hook projection 147 is inserted into the wall-mounting hole 173 defined in the wall-mounting plate 17 to fixedly support the display apparatus 10 on a wall.

Also, since the hook projection 147 is not used in the state where the fall-down prevention member 14 is coupled to the bottom surface of the lower decor 16, the seating groove 146 is shielded by a shield cover 14a to form a clean exterior.

The fall-down prevention member 14 has a top surface 141, a front surface 142, a rear surface 143, a side surface 144, and a bottom surface 145.

In detail, the top surface 141 is coupled to the bottom surface of the lower decor 16 when the fall-down prevention member 14 is installed on the floor. Also, a plurality of coupling holes 141a corresponding to the second coupling holes 164 of the lower decor 16 are defined in the top surface 141.

The front surface 142 faces a front side of the display apparatus 10 when the fall-down prevention member 14 is coupled to the lower decor 16. Also, the front surface 142 may extend downward from a front end of the top surface 141 and be inclined forward at a predetermined angle. As described above, the front surface 142 may inclinedly extend so that the bottom surface 145 has an area greater than that of the top surface 141, thereby securing the fall-down prevention effect for the display apparatus 10.

Also, a speaker hole 148 having a predetermine size may be defined in the front surface 142 to output sounds toward a front direction of the display panel 11 therethrough.

Also, the rear surface 143 is opened so that sounds generated from the audio box 15 pass through the fall-down preventing member 14 and then are transmitted up to the speaker hole 148.

It will be described with reference to the accompanying drawings that a method for switching the mounted state of the display apparatus installed on the flat floor into the wall-mounted state.

FIGS. 8 to 11 are views illustrating a process of installing the display apparatus on a wall according to an embodiment.

Figure 8:
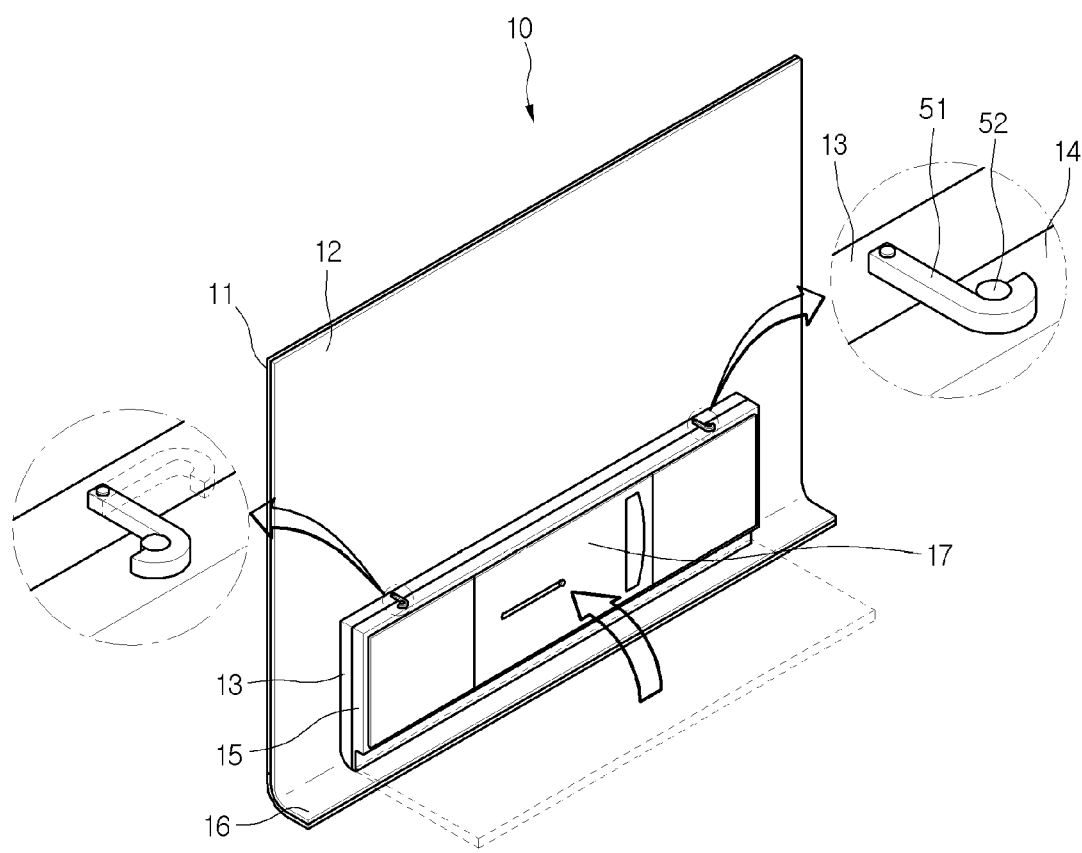
FIGS. 8 to 11 are views illustrating a process of installing the display apparatus on a wall according to an embodiment.

Referring to FIG. 8, to switch the state in which the display apparatus 10 is installed on the flat floor into the state in which the display apparatus 10 is installed on the wall, the audio box 15 is folded upward and closely attached to the rear cover 13. Here, a connection member configured to connect the rear cover 13 to the audio box 15 may be provided to prevent the display unit from falling down forward.

In detail, the connecting member may include a hook 51 rotatably installed on one of a top surface of the rear cover 13 and the rear surface of the audio box 15 and a hook protrusion 52 protruding from the other of the top surface of the rear cover 13 and the rear surface of the audio box 15. When the audio box 15 is folded upward, the rear surface of the audio box 15 and the top surface of the rear cover 13 may be flush with each other. Thus, in the state where the audio box 15 is folded upward, the locking hook 51 rotates to be hooked on the locking protrusion 52. Alternatively, the rear cover 13 may be coupled to the audio box 15 by using a coupling member such as a screw.

Figure 9:
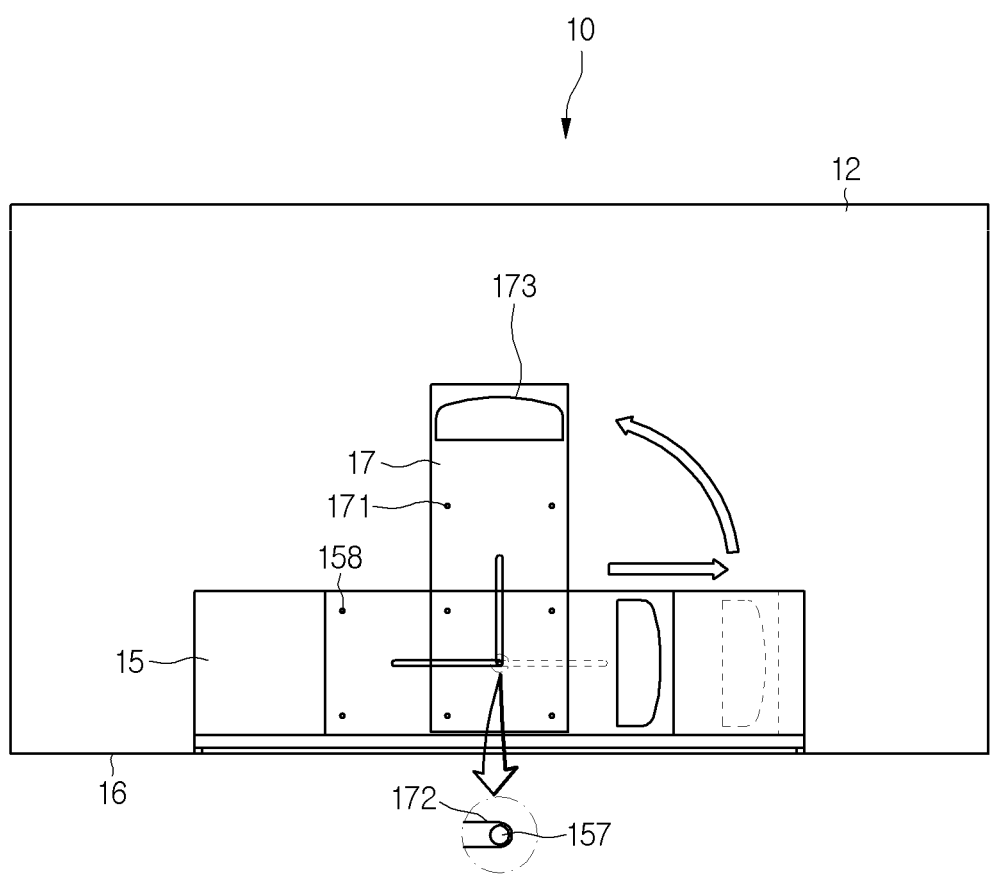

In this state, referring to FIG. 9, the wall-mounting plate 17 may freely move by releasing coupling members (six coupling members in the figures) connecting the wall-mounting plate 17 to the audio box 15.

In detail, the coupling state where the wall-mounting plate 17 is coupled to the bottom surface of the audio box 15 in a longitudinal direction of the audio box 15, i.e., a horizontal direction, is released. Then, the wall-mounting plate 17 is laterally slid. As a result, since the stopper 157 is inserted in the guide slit 172 defined in the wall-mounting plate 17, when the wall-mounting plate 17 moves toward a right side, the stopper 157 may relatively move along the guide slit 172. Also, the wall-mounting plate 17 is slid until the stopper 157 contacting one end of the guide slit 171, particularly, a right end of the guide slit 171 contacts the other end of the guide slit 171, particularly, a left end of the guide slit 171.

In a state where the wall-mounting plate 17 maximally moves to the right side, the wall-mounting plate 17 rotates in a counterclockwise direction in FIG. 9 by using the stopper 175 as a rotation center. Thus, the wall-mounting plate 17 is in a vertical state, and also the wall-mounting hole 173 is located at an upper side. In this state, the wall-mounting plate 17 is fixed again to the audio box 15 by using the coupling member. Here, the coupling member respectively coupled to each of the six pem nuts 158 is released to allow the wall-mounting plate 17 to be movable, the wall-mounting plate 17 is in the vertical state, and the four pem nuts 158 of the six pem nuts 158 are aligned with the four coupling holes 171 of the six coupling holes 171 defined in the wall-mounting plate 17. Then, the wall-mounting plate 17 is fixed to the rear surface of the audio box 15 by coupling the aligned coupling holes 171 and pem nuts 158 to each other through the coupling members.

Figure 10:
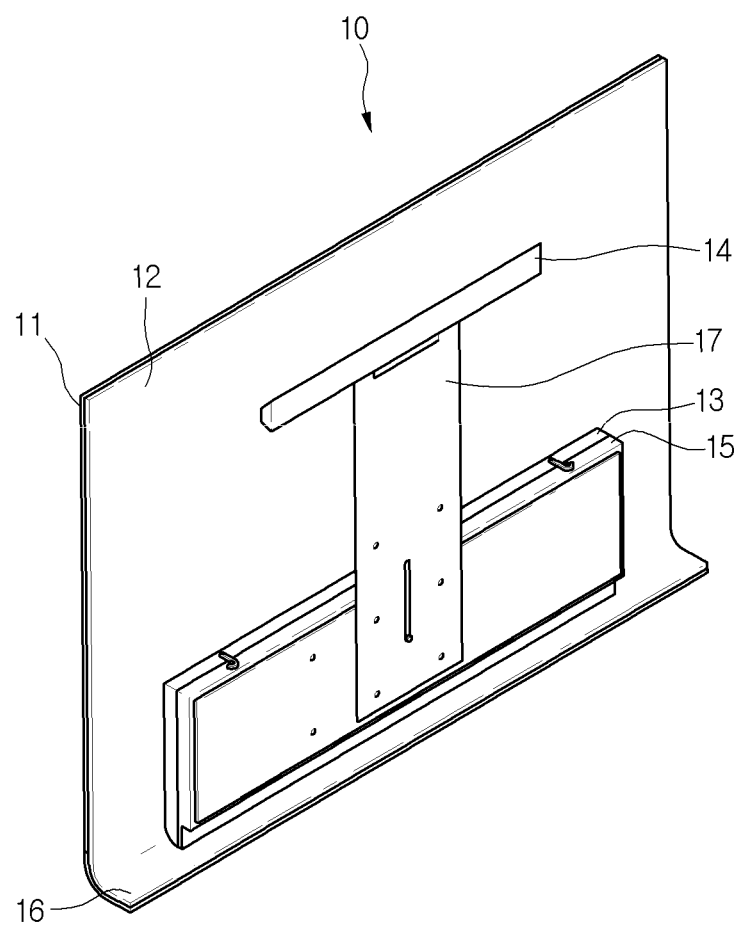
Figure 11:
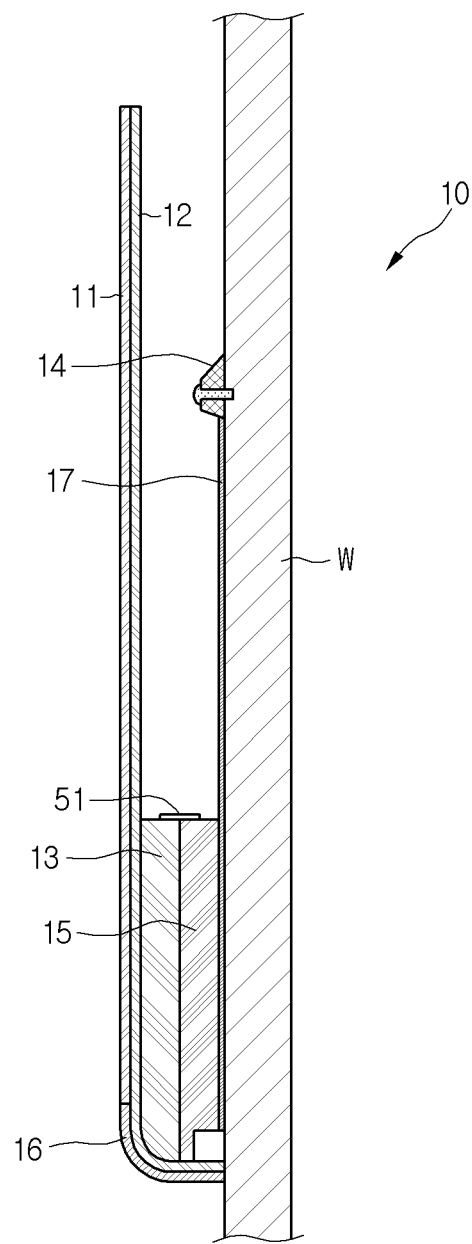

Referring to FIGS. 10 and 11, in the state where the wall-mounting plate 17 is vertically fixed at a center of the rear surface of the display unit, the fall-down prevention member 14 is separated from the lower decor 16 and then fixed to an installation wall W. Here, in the state where the bottom surface 145 of the fall-down prevention member 14 is closely attached to the installation wall W, the top surface 141 faces a front side, and the front surface 142 faces an upper side, the fall-down prevention member 14 is horizontally fixed to the installation wall W.

The hook projection 147 is inserted into the wall-mounting hole 173 of the wall-mounting plate 17, and then when the display apparatus is placed, an upper edge of the wall-mounting hole 173 is hung on an upper edge of the wall-mounting plate 17 to prevent the wall-mounting plate 17 from being separated from the fall-down prevention member 14. Here, to secure stability for preventing the wall-mounting plate 17 from being separated from the fall-down prevention member 14, a hook groove having a predetermined depth may be defined in the top surface of the locking protrusion 147, that is, a portion contacting the upper edge of the wall-mounting hole 173.

Figure 12:
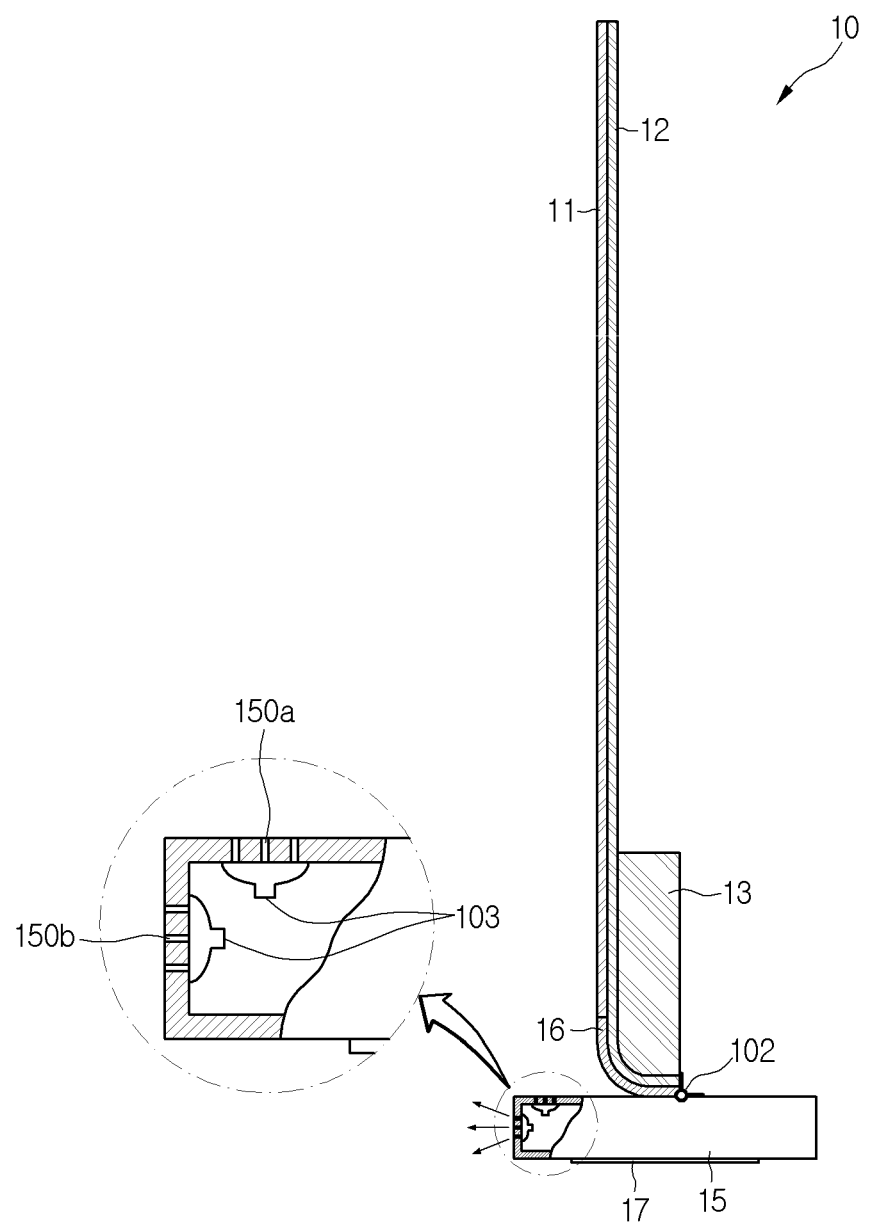
FIG. 12 is a side view of a standing type display apparatus according to another embodiment.
Figure 13:
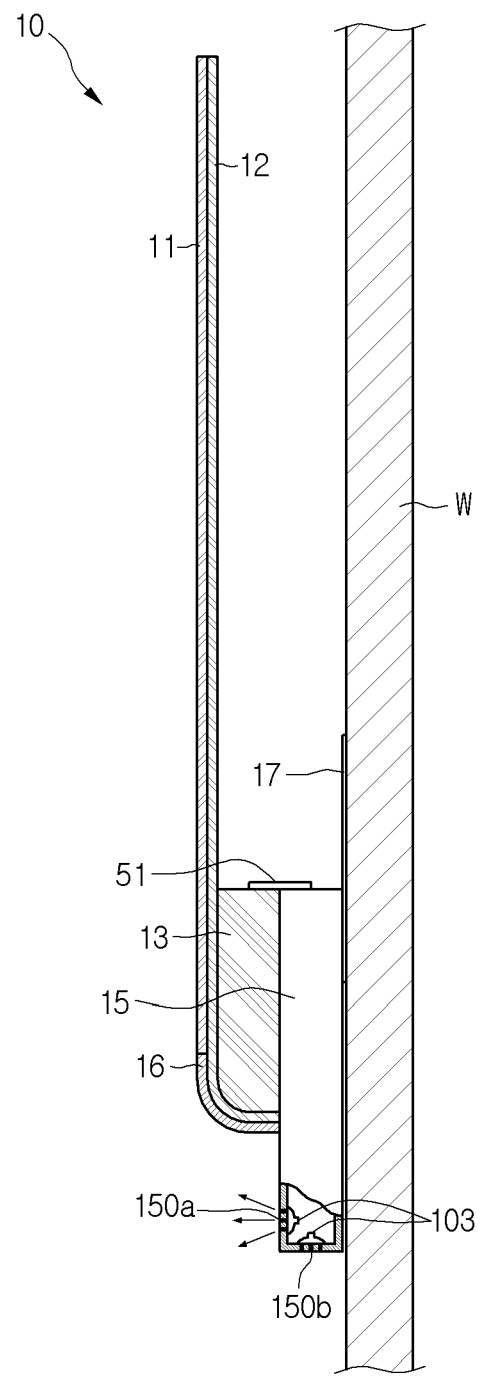
FIG. 13 is a side view of a wall-mounting type display apparatus according to another embodiment.

FIG. 12 is a side view of a standing type display apparatus according to another embodiment, and FIG. 13 is a side view of a wall-mounting type display apparatus according to another embodiment.

Referring to FIG. 12, a display apparatus 10 according to the current embodiment are the same as that of the foregoing embodiment except for a structure in which a front surface of an audio box 15 further protrudes forward from that of a display panel 11, and thus an additional fall-down prevention member 14 is unnecessary. For this, it may be necessary that a length of the audio box 15 in a forward/backward direction is greater than that of the audio box 15 according to the foregoing embodiment.

In detail, the front surface of the audio box 15 further protrudes from that of the display panel 11, and a speaker 103 is mounted on each of the front and top surfaces of the audio box 15, which correspond to the protruding portions. Also, a first speaker hole 150a and a second speaker hole 150b are defined in the top and front surfaces of the audio box 15, respectively. Also, only the speaker 103 facing a front side may be turned on in a state where the display apparatus 10 is installed on the floor. On the other hand, only the speaker 103 facing the top surface may be turned on in a state where the display apparatus 10 is mounted on a wall. Therefore, the sound directivity for always outputting sounds toward an audience may be secured. However, all of the speakers 103 may be turned on regardless of the installation types.

As described above, since the front surface of the audio box 15 further protrudes from that of display panel 11, the additional fall-down prevention member may not be necessary. Therefore, although not shown, a fixing member for fixing the wall-mounting plate 17 to the wall has to be separately provided.

What is claimed is:

1. A display apparatus comprising
   a display unit comprising a display panel for outputting an images and a panel cover for covering a rear surface of the display panel;
   a first part fixed to the rear surface of the display unit;
   a second part rotatably coupled to the first part, the second part being closely attached to the first part or being disposed on a flat floor;
   a hinge connecting a lower end of the first part to a front end of the second part;
   a wall-mounting plate separably coupled to a bottom surface of the second part; and
   a fall-down prevention member separably coupled to a lower end of the display unit.

2. The display apparatus according to claim 1, wherein, when the display unit is installed on the flat floor, the bottom surface of the second part and a bottom surface of the fall-down prevention member are closely attached to the flat floor, and
   wherein, when the display unit is installed on an installation wall, a top surface of the second part is closely attached to the first part.

3. The display apparatus according to claim 2, wherein, when the display unit is installed on the installation wall, the fall-down prevention member is fixed on the installation wall, and the second part and the fall-down prevention member are connected to each other by the wall-mounting plate.

4. The display apparatus according to claim 3, wherein the fall-down prevention member comprises:
   a seating groove in which the wall-mounting plate is seated; and
   a hook projection protruding from the seating groove, and
   wherein the wall-mounting plate comprises a wall-mounting hole inserted into the hook projection.

5. The display apparatus according to claim 4, wherein the first part comprises a rear cover configured to cover an electronic component mounted on a back surface of the display unit, and
   wherein the second part comprises an audio box accommodating a speaker.

6. The display apparatus according to claim 5, wherein, when the display unit is installed on the flat floor, a rear surface of the fall-down prevention member is closely attached to a front surface of the second part, and
   wherein a speaker hole is defined in a front surface of the fall-down prevention member.

7. The display apparatus according to claim 5, further comprising
   a plurality of pem nut members protruding from the bottom surface of the second part; and
   a stopper protruding from a center of the second part,
   wherein the pem nut members horizontally or vertically adjacent to each other are arranged at the same distance.

8. The display apparatus according to claim 4, further comprising:
   a plurality of pem nut members protruding from the bottom surface of the second part; and
   a stopper protruding from a center of the second part,
   wherein the pem nut members horizontally or vertically adjacent to each other are arranged at the same distance.

9. The display apparatus according to claim 8, wherein the wall-mounting plate further comprises:
   a coupling hole into which each of a plurality of pem nut members is inserted; and
   a guide slit into which the stopper is inserted,
   wherein the guide slit extends by at a predetermined length in a longitudinal direction of the wall-mounting plate.

10. The display apparatus according to claim 8, wherein the wall-mounting plate further comprises:
    a coupling hole into which each of a plurality of pem nut members is inserted; and
    a guide slit into which the stopper is inserted,
    wherein the guide slit extends by at a predetermined length in a longitudinal direction of the wall-mounting plate.

11. The display apparatus according to claim 8, wherein the wall-mounting plate further comprises:
    a coupling hole into which each of a plurality of pem nut members is inserted; and
    a guide slit into which the stopper is inserted,
    wherein the guide slit extends by at a predetermined length in a longitudinal direction of the wall-mounting plate.

12. The display apparatus according to claim 9, wherein, when the display unit is installed on the wall, the wall-mounting plate moves by a length corresponding to that of the guide slit to rotate with respect to the stopper, thereby fixing a lower portion of the wall-mounting plate to the second part in a state where the wall-mounting plate is perpendicular to the second part, and wherein an upper end of the wall-mounting plate is coupled to the fall-down prevention member.

13. The display apparatus according to claim 9, wherein, when the display unit is installed on the wall, the wall-mounting plate moves by a length corresponding to that of the guide slit to rotate with respect to the stopper, thereby fixing a lower portion of the wall-mounting plate to the second part in a state where the wall-mounting plate is perpendicular to the second part, and
    wherein an upper end of the wall-mounting plate is coupled to the fall-down prevention member.

14. The display apparatus according to claim 9, wherein, when the display unit is installed on the installation wall, the wall-mounting plate moves by a length corresponding to that of the guide slit to rotate with respect to the stopper, thereby fixing a lower portion of the wall-mounting plate to the second part in a state where the wall-mounting plate is perpendicular to the second part, and
    wherein an upper end of the wall-mounting plate is coupled to the fall-down prevention member.

15. The display apparatus according to claim 4, further comprising:
    a plurality of pem nut members protruding from the bottom surface of the second part; and a stopper protruding from a center of the second part,
wherein the pem nut members horizontally or vertically adjacent to each other are arranged at the same distance.

16. The display apparatus according to claim 4, further comprising a shield cover configured to cover the seating groove.

17. The display apparatus according to claim 1, further comprising a lower decor coupled to a lower end of the display unit, the lower decor being bent in an L-shape.

18. The display apparatus according to claim 17, wherein the fall-down prevention member is coupled to a bottom surface of the lower decor by a coupling member.

* * * * *